United States Patent
Wang et al.

(10) Patent No.: US 9,854,621 B2
(45) Date of Patent: Dec. 26, 2017

(54) WIRELESS CONNECTION SWITCHING METHOD, WIRELESS TERMINAL, AND SYSTEM THEREOF

(71) Applicant: Huawei Technologies Co., Ltd., Shenzhen (CN)

(72) Inventors: Runzhi Wang, Xi'an (CN); Rui Fan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/901,819

(22) PCT Filed: Jun. 17, 2014

(86) PCT No.: PCT/CN2014/080052
§ 371 (c)(1),
(2) Date: Dec. 29, 2015

(87) PCT Pub. No.: WO2015/192310
PCT Pub. Date: Dec. 23, 2015

(65) Prior Publication Data
US 2017/0094708 A1    Mar. 30, 2017
US 2017/0332432 A9    Nov. 16, 2017

(51) Int. Cl.
*H04W 76/04* (2009.01)
*H04W 76/06* (2009.01)
*H04W 4/00* (2009.01)

(52) U.S. Cl.
CPC .......... *H04W 76/04* (2013.01); *H04W 4/008* (2013.01); *H04W 76/06* (2013.01)

(58) Field of Classification Search
None
See application file for complete search history.

(56) References Cited

U.S. PATENT DOCUMENTS

| 7,769,412 B1 | 8/2010 | Gailloux | |
| 7,925,212 B2* | 4/2011 | Eisenbach | H04M 1/7253 370/328 |
| 8,346,938 B1* | 1/2013 | Caddes | H04L 12/403 455/556.2 |

(Continued)

FOREIGN PATENT DOCUMENTS

| CN | 1878089 A | 12/2006 |
| CN | 102835951 A | 12/2012 |

(Continued)

*Primary Examiner* — Brian Roberts (57) ABSTRACT

The present application provides a wireless connection switching method, a wireless terminal, and a system thereof, which are used to automatically switch a wireless connection state. For example: detecting whether a wireless terminal is connected to a bearer device of the wireless terminal; disconnecting a wireless data connection between the wireless terminal and a specified terminal if the wireless terminal is connected to the bearer device; and establishing the wireless data connection between the wireless terminal and the specified terminal if the wireless terminal is disconnected from the bearer device. In this way, it is implemented that a wireless terminal automatically switches a wireless connection state according to a different status of a connection to a bearer device.

16 Claims, 3 Drawing Sheets

(56) References Cited

U.S. PATENT DOCUMENTS

| | | | |
|---|---|---|---|
| 2004/0198366 A1* | 10/2004 | Crocker | H04W 76/028 |
| | | | 455/452.1 |
| 2005/0202783 A1* | 9/2005 | Yueh | H04M 1/6091 |
| | | | 455/41.3 |
| 2006/0199534 A1 | 9/2006 | Smith | |
| 2011/0165896 A1 | 7/2011 | Stromberg et al. | |
| 2012/0302170 A1 | 11/2012 | Frazier et al. | |
| 2013/0029604 A1 | 1/2013 | Saito et al. | |
| 2013/0225078 A1 | 8/2013 | Johansson et al. | |
| 2014/0065962 A1* | 3/2014 | Le | H04M 1/7253 |
| | | | 455/41.2 |
| 2014/0274033 A1* | 9/2014 | Smart | H04W 52/028 |
| | | | 455/426.1 |
| 2016/0241942 A1 | 8/2016 | Hsieh et al. | |

FOREIGN PATENT DOCUMENTS

| | | |
|---|---|---|
| CN | 103763647 A | 4/2014 |
| CN | 203574705 U | 4/2014 |
| CN | 103795446 A | 5/2014 |
| CN | 103815628 A | 5/2014 |
| JP | 2001052762 A | 2/2001 |
| JP | 2005094442 A | 4/2005 |
| JP | 2007150904 | 6/2007 |
| JP | 2008263353 A | 10/2008 |
| JP | 2012005098 | 1/2012 |
| JP | 2012147146 | 8/2012 |

\* cited by examiner

WIRELESS CONNECTION SWITCHING METHOD, WIRELESS TERMINAL, AND SYSTEM THEREOF

CROSS REFERENCE TO RELATED APPLICATIONS

The present application claims priority under 35 U.S.C. §365 to International Patent Application No. PCT/CN2014/080052 filed Jun. 17, 2014 and which is incorporated herein by reference into the present disclosure as if fully set forth herein.

TECHNICAL FIELD

The present invention relates to the communications field, and in particular, to a wireless connection switching method, a wireless terminal, and a system thereof.

BACKGROUND

A radio technology is a technology in which a signal is transmitted by using a radio wave; for example, Bluetooth is a radio technology that supports short range communication (within 10 m generally) between devices. Wireless information exchange can be performed between many devices, including a mobile phone, a PDA, a wireless headset, a notebook computer, a related peripheral, and the like. By using a "Bluetooth" technology, communication between mobile communications terminal devices can be effectively simplified, and communication between a device and the Internet can also be successfully simplified, so that data transmission becomes more fast and efficient, which paves the way for wireless communications.

A wireless terminal can be wirelessly connected to another device by using a radio technology. A wireless connection between the wireless terminal and another device has two statuses: one is a connected state, and the other is a disconnected state. A user needs to manually switch between the two states according to a use situation of the user.

However, in a practical application, each connecting or disconnecting requires a user to manually switch a wireless connection state, which increases an operation of the user and reduces user experience.

SUMMARY

Embodiments of the present invention provide a wireless connection switching method, a wireless terminal, and a system thereof, which are used to automatically switch a wireless connection state.

A first aspect of the embodiments of the present invention provides a wireless connection switching method, including:

detecting whether a wireless terminal is connected to a bearer device of the wireless terminal;

disconnecting a wireless data connection between the wireless terminal and a specified terminal if it is determined that the wireless terminal is connected to the bearer device; and establishing the wireless data connection between the wireless terminal and the specified terminal if it is determined that the wireless terminal is disconnected from the bearer device.

With reference to the first aspect of the embodiments of the present invention, in a first implementation manner of the first aspect of the embodiments of the present invention, before the step of detecting whether a wireless terminal is connected to a bearer device, the method further includes:

connecting the wireless terminal and the bearer device, and establishing the wireless data connection between the wireless terminal and the specified terminal.

With reference to the first aspect or the first implementation manner of the first aspect of the embodiments of the present invention, in a second implementation manner of the first aspect of the embodiments of the present invention, the detecting whether a wireless terminal is connected to a bearer device of the wireless terminal specifically includes:

detecting whether the wireless terminal is electrically connected to the bearer device;

or, detecting whether the wireless terminal is wirelessly connected to the bearer device.

A second aspect of the embodiments of the present invention provides a wireless terminal, including:

a detecting module, configured to detect whether the wireless terminal is connected to a bearer device of the wireless terminal;

a disconnecting module, configured to disconnect a wireless data connection between the wireless terminal and a specified terminal when the detecting module determines that the wireless terminal is connected to the bearer device; and a connecting module, configured to establish the wireless data connection between the wireless terminal and the specified terminal when the detecting module determines that the wireless terminal is disconnected from the bearer device.

With reference to the second aspect of the embodiments of the present invention, in a first implementation manner of the second aspect of the embodiments of the present invention, the wireless terminal further includes:

an initializing module, configured to connect the wireless terminal and the bearer device, and establish the wireless data connection between the wireless terminal and the specified terminal.

With reference to the second aspect or the first implementation manner of the second aspect of the embodiments of the present invention, in a second implementation manner of the second aspect of the embodiments of the present invention, the detecting module is specifically configured to detect whether the wireless terminal is electrically connected to the bearer device;

or, the detecting module is specifically configured to detect whether the wireless terminal is wirelessly connected to the bearer device.

A third aspect of the embodiments of the present invention provides a wearable device, including: the wireless terminal according to any one of the second aspect to the second implementation manner of the second aspect of the embodiments of the present invention, and a bearer device that is detachably connected to the wireless terminal.

A fourth aspect of the embodiments of the present invention provides a wireless terminal, including:

a processor, a memory, a transmitter, and an interface, where the processor is connected to the memory, the transmitter, and the interface through a data bus; and the processor is configured to perform, by invoking an operation instruction stored in the memory, the following steps:

detecting, by the processor, whether the interface is connected to a bearer device of the wireless terminal;

when the processor determines that the interface is connected to the bearer device, controlling the transmitter to disconnect a wireless data connection from a specified terminal; and when the processor determines that the interface is disconnected from the bearer device, controlling the transmitter to establish the wireless data connection to the specified terminal.

With reference to the fourth aspect of the embodiments of the present invention, in a first implementation manner of the fourth aspect of the embodiments of the present invention, the interface is a physical interface or a wireless interface.

With reference to the first implementation manner of the fourth aspect of the embodiments of the present invention, in a second implementation manner of the fourth aspect of the embodiments of the present invention, the transmitter is a Bluetooth transmitter or an NFC transmitter.

A fifth aspect of the embodiments of the present invention provides a wearable device, including: the wireless terminal according to any one of the fourth aspect to the second implementation manner of the fourth aspect of the embodiments of the present invention, and a bearer device that is detachably connected to the wireless terminal.

A sixth aspect of the embodiments of the present invention provides a data transmission system, including: the wireless terminal according to any one of the fourth aspect to the second implementation manner of the fourth aspect of the embodiments of the present invention, a bearer device that is detachably connected to the wireless terminal, and a specified terminal between which and the wireless terminal a wireless data connection is established.

It can be seen from the foregoing technical solutions that, the embodiments of the present invention have the following advantages: In the embodiments of the present invention, it is detected whether a wireless terminal is connected to a bearer device of the wireless terminal; a wireless data connection between the wireless terminal and a specified terminal is disconnected if the wireless terminal is connected to the bearer device; and the wireless data connection between the wireless terminal and the specified terminal is established if the wireless terminal is disconnected from the bearer device. In this way, it is implemented that a wireless terminal automatically switches a wireless connection state according to a different status of a connection to a bearer device, thereby reducing an operation that a user needs to perform and improving user experience.

BRIEF DESCRIPTION OF THE DRAWINGS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

Figure 1:
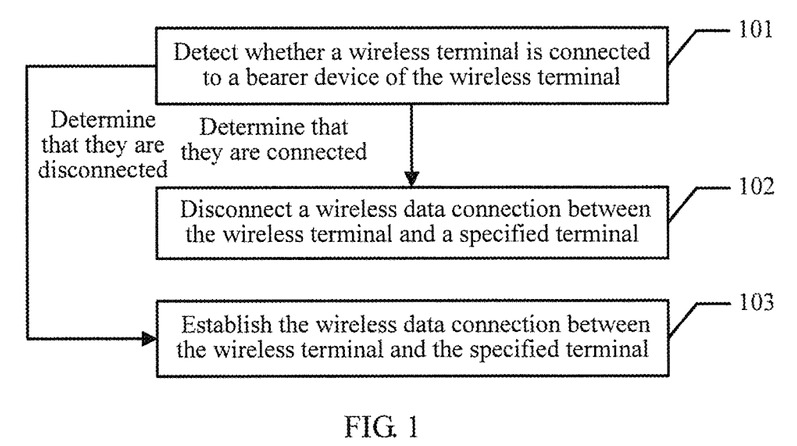
FIG. 1 is a schematic flowchart of a wireless connection switching method according to an embodiment of the present invention.

Referring to FIG. 1, an embodiment of a wireless connection switching method in the embodiments of the present invention includes the following steps:

101. Detect whether a wireless terminal is connected to a bearer device of the wireless terminal. If connected, step 102 is performed; and if disconnected, step 103 is performed.

The wireless terminal or a wearable device that includes the wireless terminal and the bearer device detects whether the wireless terminal is connected to the bearer device of the wireless terminal;

if it is determined that the wireless terminal is connected to the bearer device, step 102 is performed; and if it is determined that the wireless terminal is disconnected from the bearer device, step 103 is performed.

102. Disconnect a wireless data connection between the wireless terminal and a specified terminal.

When it is determined that the wireless terminal is connected to the bearer device, the wireless terminal or the wearable device disconnects the wireless data connection between the wireless terminal and the specified terminal, where the specified terminal indicates a terminal that is specified to perform a wireless data connection to the wireless terminal.

103. Establish the wireless data connection between the wireless terminal and the specified terminal.

When it is determined that the wireless terminal is disconnected from the bearer device, the wireless terminal or the wearable device establishes the wireless data connection between the wireless terminal and the specified terminal.

In this embodiment of the present invention, it is detected whether a wireless terminal is connected to a bearer device of the wireless terminal; a wireless data connection between the wireless terminal and a specified terminal is disconnected if the wireless terminal is connected to the bearer device; and the wireless data connection between the wireless terminal and the specified terminal is established if the wireless terminal is disconnected from the bearer device. In this way, it is implemented that a wireless terminal automatically switches a wireless connection state according to a different status of a connection to a bearer device, thereby reducing an operation that a user needs to perform and improving user experience.

Optionally, as another embodiment of the present invention, in a practical application, if the wireless terminal and the specified terminal are used for the first time or have not established connection pairing, before it is detected whether the wireless terminal is connected to the bearer device of the wireless terminal, the wireless terminal may be first connected to the bearer device, and the wireless data connection is established between the wireless terminal and the specified terminal.

In the foregoing embodiments, the wireless terminal or the wearable device detects whether the wireless terminal is connected to the bearer device. It may be understood that, the detection may be active or may be passive. When the detection is active detection, the detection may be a continuous process, whether the wireless terminal is connected to the bearer device may keep being detected, and a subsequent step is triggered; it may also be set that detection is performed at a fixed time interval; it may also be set that detection is performed when triggered by a preset condition (for example, a position change of the wireless terminal); and there are various detection triggering manners, which are not limited herein. Optionally, when it is detected that a connection state between the wireless terminal and the bearer device is the same as a connection state that is detected last time, for example, when it is detected for the first time that the wireless terminal is connected to the bearer device, step 102 is performed, and when it is detected again in the second detection that the wireless terminal is connected to the bearer device, a subsequent step may not be performed until it is detected that the connection state changes. For example, when it is detected in the third detection that the wireless terminal is disconnected from the bearer device, corresponding subsequent step 103 is performed. If the detection is passive, that is, a connection state change can be detected when the connection state changes, for example, a contact is touched when the wireless terminal is connected to the bearer device and the contact is released when the connection is disconnected, a subsequent step may be correspondingly performed when the connection state changes.

In a practical application, there are many manners in which the wireless terminal is connected to the bearer device; correspondingly, there are also many manners for detecting whether the wireless terminal is connected to the bearer device, which may specifically include the following manners: The wireless terminal may be electrically connected to the bearer device, and whether the wireless terminal is connected to the bearer device is detected by detecting whether a closed circuit is formed, for example, if a circuit is closed, it indicates that the wireless terminal is connected to the bearer device, and if the circuit is interrupted, it indicates that the wireless terminal is disconnected from the bearer device; the electrical connection manner also includes a physical connection, and whether the wireless terminal is physically in contact with the bearer device is detected by detecting a status of a contact, for example, if the contact is pressed down, it indicates that the wireless terminal is connected to the bearer device, and if the contact bounces off, it indicates that the wireless terminal is disconnected from the bearer device; the wireless terminal may also be wirelessly connected to the bearer device, and whether the wireless terminal is connected to the bearer device is detected by detecting a connection state of a wireless connection; there may further be another connection manner and a corresponding manner for detecting a connection, which is not limited herein.

It may be understood that, the wireless terminal may independently exist, or may form a wearable device together with the bearer device. For example, when the wireless terminal is connected to the bearer device by means of physical contact, the wireless terminal and the bearer device may be detachably connected to form a wearable device, which is not limited herein. In addition, the number of bearer devices may not be only one, and multiple parts together may also form a bearer device; or in some cases, it is determined that a wireless terminal is connected to a bearer device only when the wireless terminal needs to be simultaneously connected to multiple bearer devices, which is not limited herein.

Optionally, there are many manners for establishing the wireless data connection between the wireless terminal and the specified terminal, for example, the connection may be established by using Bluetooth or wifi, or may be established in a mode such as infrared, NFC, or network interface, which is not limited herein.

For ease of understanding, a wireless connection state switching method in an embodiment of the present invention is described in detail in the following by using a specific application scenario.

Figure 2:
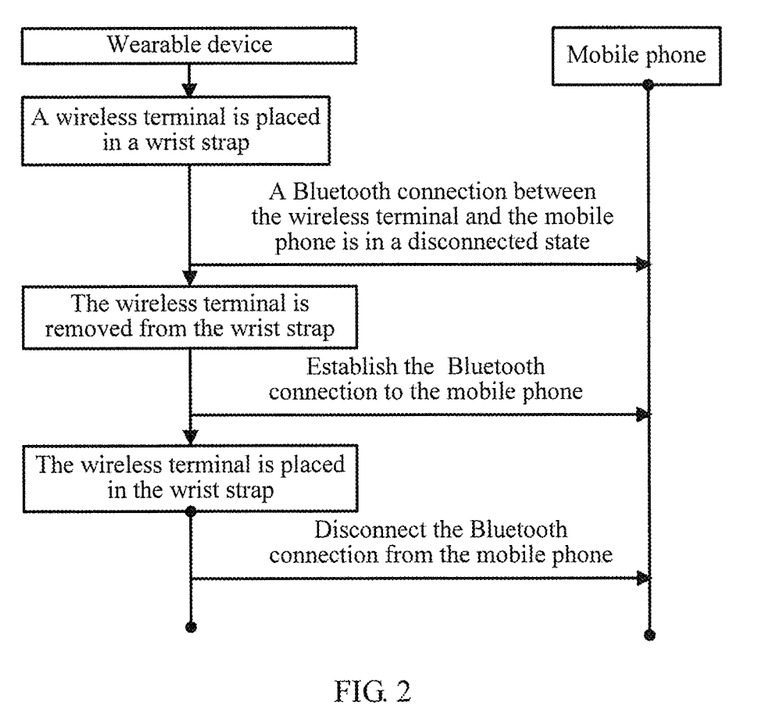
FIG. 2 is a schematic diagram of an instance of a wireless connection switching method according to an embodiment of the present invention.

Referring to FIG. 2, a wireless terminal is a terminal that has a Bluetooth headset, a bearer device is a wrist strap, the wireless terminal and the wrist strap are detachably connected to form a wearable device, a specified terminal is a mobile phone, and the wireless terminal performs a wireless data connection to the mobile phone by using the Bluetooth A2DP protocol.

The wireless terminal is placed in the wrist strap and is connected to the wrist strap through a contact. The wearable device detects that the wireless terminal and the wrist strap are in a connected state; and in this case, a Bluetooth A2DP connection between the wireless terminal and the mobile phone is in a disconnected state. Before that, Bluetooth pairing has been performed between the wireless terminal and the mobile phone.

When the wireless terminal is removed from the wrist strap, the wearable device detects that the wireless terminal is disconnected from the wrist strap; and in this case, the wearable device actively establishes a Bluetooth connection between the wireless terminal and the mobile phone.

When the wireless terminal is placed in the wrist strap, the wearable device detects that the wireless terminal is connected to the wrist strap; and in this case, the wearable device actively disconnects the Bluetooth connection between the wireless terminal and the mobile phone.

Figure 4:
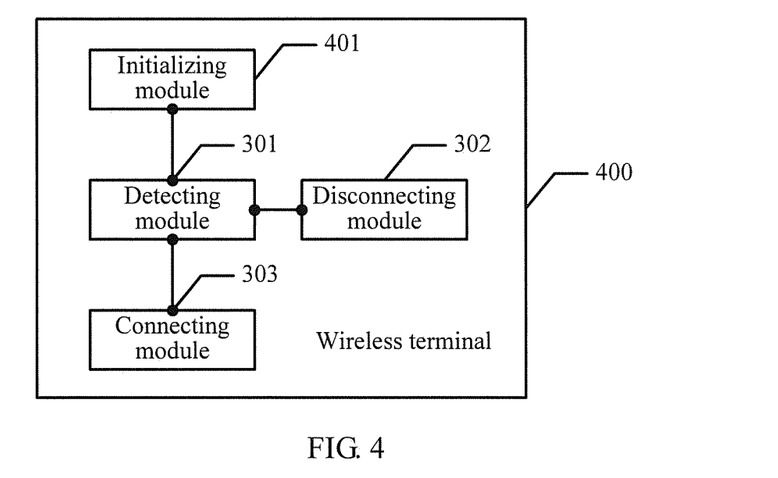
FIG. 4 is another schematic structural diagram of a wireless terminal according to an embodiment of the present invention.

The following describes a wireless terminal in an embodiment of the present invention. Referring to FIG. 4, an embodiment of a wireless terminal 300 according to this embodiment of the present invention includes:

a detecting module 301, configured to detect whether the wireless terminal is connected to a bearer device of the wireless terminal;

a disconnecting module 302, configured to disconnect a wireless data connection between the wireless terminal and a specified terminal when the detecting module 301 determines that the wireless terminal is connected to the bearer device; and a connecting module 303, configured to establish the wireless data connection between the wireless terminal and the specified terminal when the detecting module 302 determines that the wireless terminal is disconnected from the bearer device.

In this embodiment of the present invention, the detecting unit 301 detects whether a wireless terminal is connected to a bearer device of the wireless terminal; the disconnecting module 302 disconnects a wireless data connection between the wireless terminal and a specified terminal if the wireless terminal is connected to the bearer device; and the connecting module 303 establishes the wireless data connection between the wireless terminal and the specified terminal if the wireless terminal is disconnected from the bearer device.

In this way, it is implemented that a wireless terminal automatically switches a wireless connection state according to a different status of a connection to a bearer device, thereby reducing an operation that a user needs to perform and improving user experience.

Optionally, as another embodiment of the wireless terminal, referring to FIG. 4, the wireless terminal 400 may further include:

an initializing module 401, configured to connect the wireless terminal and the bearer device, and establish the wireless data connection between the wireless terminal and the specified terminal.

Before the detecting module 301 runs, the initializing module 401 may be started once to initialize statuses of various apparatuses, so that various subsequent operations can be accurately performed.

Optionally, there are many manners in which the wireless terminal is connected to the bearer device; correspondingly, there are also many manners in which the detecting module detects whether the wireless terminal is connected to the bearer device, where:

the detecting module 301 may be specifically configured to detect whether the wireless terminal is electrically connected to the bearer device, and it may be understood that an electrical connection includes physical contact;

or, the detecting module 301 may be specifically configured to detect whether the wireless terminal is physically in contact with the bearer device.

For ease of understanding the foregoing embodiments, the following describes an interaction process of the foregoing modules of the wireless terminal in a specific application scenario.

A wireless terminal is a terminal that has a Bluetooth headset function, a bearer device is a wrist strap, the wireless terminal and the wrist strap are detachably connected to form a wearable device, a specified terminal is a mobile phone, and the wireless terminal performs a wireless data connection to the mobile phone by using the Bluetooth A2DP protocol.

The wireless terminal is placed in the wrist strap and is connected to the wrist strap through a contact. An initializing module 401 connects the wireless terminal and the wrist strap, and establishes a wireless data connection between the wireless terminal and the mobile phone.

A detecting module 301 detects that the wireless terminal and the wrist strap are in a connected state, and a disconnecting module 302 actively disconnects a Bluetooth connection between the wireless terminal and the mobile phone.

When the wireless terminal is removed from the wrist strap, the detecting module 301 detects that the wireless terminal is disconnected from the wrist strap; and in this case, a connecting module 303 actively establishes the Bluetooth connection between the wireless terminal and the mobile phone.

When the wireless terminal is placed in the wrist strap, the detecting module 301 detects that the wireless terminal is connected to the wrist strap; and in this case, the disconnecting module 302 actively disconnects the Bluetooth connection between the wireless terminal and the mobile phone.

Figure 6:
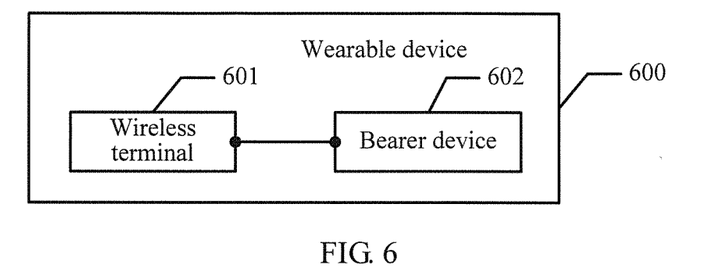
FIG. 6 is a schematic structural diagram of a wearable device according to an embodiment of the present invention.

The foregoing describes the wireless terminal in this embodiment of the present invention from the perspective of a unit functional entity, and the following describes the wireless terminal in this embodiment of the present invention from the perspective of hardware processing. Referring to FIG. 6, another embodiment of a wireless terminal 500 in this embodiment of the present invention includes:

a processor 501, a memory 502, a transmitter 503, and an interface 504, where the processor is connected to the memory 502, the transmitter 503, and the interface 504 through a data bus 505; and the processor 501 is configured to perform, by invoking an operation instruction stored in the memory 502, the following steps:

detecting, by the processor 501, whether the interface 504 is connected to a bearer device;

when the processor 501 determines that the interface 504 is connected to the bearer device, controlling the transmitter 503 to disconnect a wireless data connection from a specified terminal; and when the processor 501 determines that the interface 504 is disconnected from the bearer device, controlling the transmitter 503 to establish the wireless data connection to the specified terminal.

Optionally, in a practical application, the interface 504 may be a physical interface or may be a wireless interface, which is not limited herein.

Optionally, the transmitter may be a Bluetooth transmitter, or may be an NFC transmitter, or may be another wireless transmitter, which is not limited herein.

Figure 3:
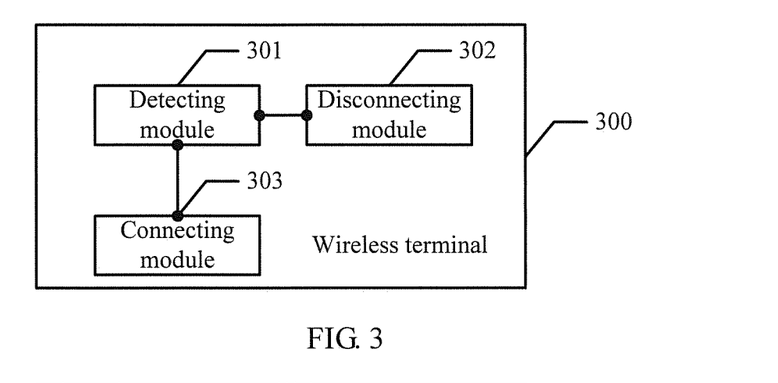
FIG. 3 is a schematic structural diagram of a wireless terminal according to an embodiment of the present invention.
Figure 5:
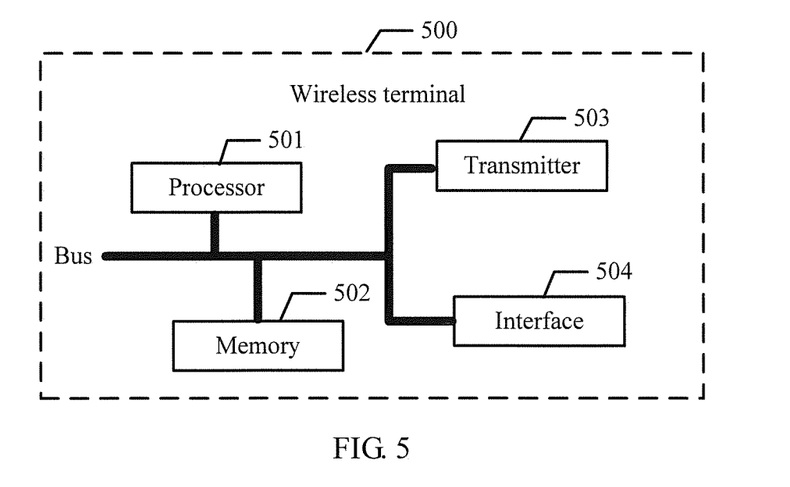
FIG. 5 is another schematic structural diagram of a wireless terminal according to an embodiment of the present invention.

The following describes a wearable device in an embodiment of the present invention. Referring to FIG. 6, a wearable device 600 in this embodiment of the present invention includes:

a wireless terminal 601 shown in FIG. 3, FIG. 4, or FIG. 5, and a bearer device 602, where:

the bearer device 602 may be configured to perform a detachable connection to the wireless terminal 601.

Figure 7:
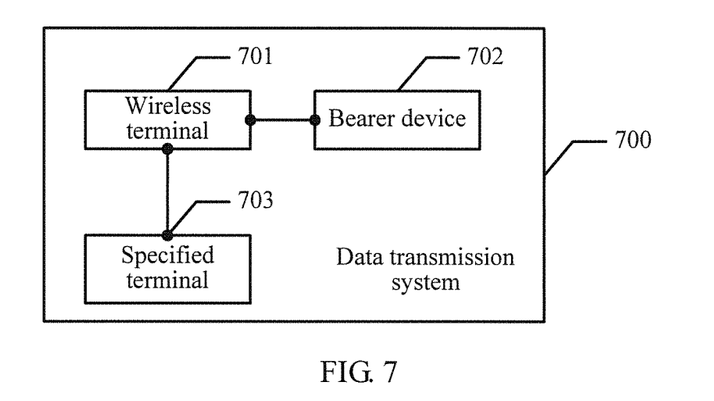
FIG. 7 is a schematic structural diagram of a data transmission system according to an embodiment of the present invention.

The following describes a data transmission system in an embodiment of the present invention. Referring to FIG. 7, an embodiment of a data transmission system 700 in this embodiment of the present invention includes:

a wireless terminal 701 shown in FIG. 3, FIG. 4, or FIG. 6, a bearer device 702, and a specified terminal 703, where:

the bearer device 702 is configured to be detachably connected to the wireless terminal 701; and the specified terminal 703 is configured to establish a wireless data connection to the wireless terminal 701.

Figure 8:
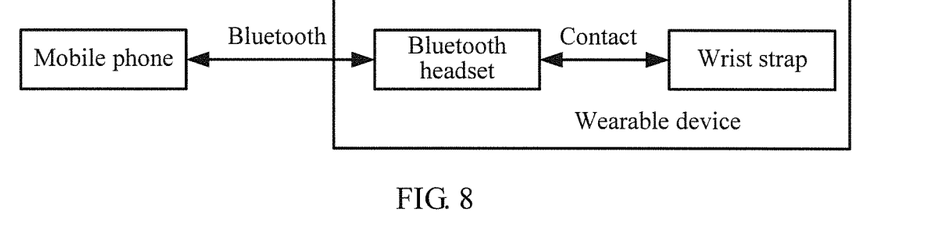
FIG. 8 is a schematic structural diagram of an instance of a data transmission system according to an embodiment of the present invention.

Referring to FIG. 8, FIG. 8 shows a specific instance of a data transmission system in an embodiment of the present invention, where a wearable device includes a Bluetooth headset that is used as a wireless terminal, and a wrist strap that is used as a bearer device; and a specified terminal is a mobile phone, the Bluetooth headset is connected to the wrist strap through a contact, and the Bluetooth headset is connected to the mobile phone through Bluetooth.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the foregoing described apparatus embodiment is merely exemplary. For example, the unit division is merely logical function division or may be another division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions in the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the spirit and scope of the technical solutions in the embodiments of the present invention.

What is claimed is:

1. A method for wireless connection switching, the method comprising:
   detecting, by a wireless terminal, whether the wireless terminal is connected to a bearer device of the wireless terminal; and
   disconnecting, by the wireless terminal, a wireless data connection between the wireless terminal and a specified terminal when it is determined that the wireless terminal is connected to the bearer device.

2. The method according to claim 1, further comprising:
   establishing, by the wireless terminal, the wireless data connection between the wireless terminal and the specified terminal when it is determined that the wireless terminal is disconnected from the bearer device.

3. The method according to claim 2, wherein detecting, by the wireless terminal, whether the wireless terminal is connected to the bearer device of the wireless terminal comprises:
   detecting, by the wireless terminal, whether the wireless terminal is electrically connected to the bearer device.

4. The method according to claim 2, wherein detecting, by the wireless terminal, whether the wireless terminal is connected to the bearer device of the wireless terminal comprises:
   detecting, by the wireless terminal, whether the wireless terminal is wirelessly connected to the bearer device.

5. The method according to claim 2, wherein before detecting, by the wireless terminal, whether a wireless terminal is connected to a bearer device, the method further comprises:
   connecting, by the wireless terminal, the wireless terminal and the bearer device, and establishing the wireless data connection between the wireless terminal and the specified terminal.

6. The method according to claim 1, wherein detecting, by the wireless terminal, whether the wireless terminal is connected to the bearer device of the wireless terminal comprises:
   detecting, by the wireless terminal, whether the wireless terminal is electrically connected to the bearer device.

7. The method according to claim 1, wherein detecting, by the wireless terminal, whether the wireless terminal is connected to the bearer device of the wireless terminal comprises:
   detecting, by the wireless terminal, whether the wireless terminal is wirelessly connected to the bearer device.

8. The method according to claim 1, wherein before detecting, by the wireless terminal, whether a wireless terminal is connected to a bearer device, the method further comprises:
   connecting, by the wireless terminal, the wireless terminal and the bearer device, and establishing the wireless data connection between the wireless terminal and the specified terminal.

9. A wireless terminal, comprising:
   a processor, a memory, a transmitter, and an interface, wherein the processor is connected to the memory, the transmitter, and the interface through a data bus; and
   the processor is configured to perform, by invoking one or more operation instructions stored in the memory, the following:
      detecting, by the processor, whether the interface is connected to a bearer device of the wireless terminal, and
      controlling the transmitter to disconnect a wireless data connection from a specified terminal, when the processor determines that the interface is connected to the bearer device.

10. The wireless terminal according to claim 9, the processor is further configured to perform the following:
    controlling the transmitter to establish the wireless data connection to the specified terminal, when the processor determines that the interface is disconnected from the bearer device.

11. The wireless terminal according to claim 10, wherein the interface is a physical interface or a wireless interface.

12. The wireless terminal according to claim 10, wherein the transmitter is a Bluetooth transmitter or a near field communications (NFC) transmitter.

13. The wireless terminal according to claim 9, wherein the interface is a physical interface or a wireless interface.

14. The wireless terminal according to claim 9, wherein the transmitter is a Bluetooth transmitter or a near field communications (NFC) transmitter.

15. A wearable device, comprising:
a wireless terminal and a bearer device that is detachably connected to the wireless terminal, wherein the wireless terminal comprises:
a processor, a memory, a transmitter, and an interface, wherein the processor is connected to the memory, the transmitter, and the interface through a data bus, and
the processor is configured to perform, by invoking one or more operation instructions stored in the memory, the following:
detecting, by the processor, whether the interface is connected to a bearer device of the wireless terminal; and
controlling the transmitter to disconnect a wireless data connection from a specified terminal, when the processor determines that the interface is connected to the bearer device.

16. The wearable device according to claim 15, wherein the processor is further configured to perform the following:
controlling the transmitter to establish the wireless data connection to the specified terminal, when the processor determines that the interface is disconnected from the bearer device.

* * * * *